United States Patent [19]

Peterson

[11] 3,830,120
[45] Aug. 20, 1974

[54] TIRE CUTTER APPARATUS
[75] Inventor: Harold Severin Peterson, Fargo, N. Dak.
[73] Assignee: Applied Power Industries Inc., Milwaukee, Wis.
[22] Filed: Nov. 30, 1973
[21] Appl. No.: 420,441

Related U.S. Application Data
[63] Continuation of Ser. No. 229,635, Feb. 28, 1972, abandoned.

[52] U.S. Cl............................. 82/54, 82/58, 82/101, 157/13
[51] Int. Cl.......................... B23b 5/14, B29h 21/08
[58] Field of Search.......... 82/46, 101, 59, 60, 70.2, 82/71, 79, 80, 83, 84, 91, 97, 98, 99, 85, 54, 58; 157/13

[56] References Cited
UNITED STATES PATENTS

| | | | |
|---|---|---|---|
| 1,440,397 | 1/1923 | McClenathen et al. | 157/13 |
| 2,581,928 | 1/1952 | Broden | 157/13 |
| 2,733,765 | 2/1956 | Holroyd et al. | 157/13 |
| 2,754,905 | 7/1956 | Kraft | 157/13 |
| 2,794,503 | 6/1957 | Kraft | 157/13 |
| 2,936,828 | 5/1960 | Richner | 157/13 |
| 3,584,673 | 6/1971 | Lehmann | 157/13 |
| 3,701,296 | 10/1972 | Show | 82/54 |

Primary Examiner—Harrison L. Hinson
Attorney, Agent, or Firm—Roy E. Petherbridge; Robert L. Lindgren; Edward D. Gilhooly

[57] ABSTRACT

A tire cutter apparatus for cutting a strip of a crown of a tire or splitting a tire circumferentially including a fixed rotating knife or knives in contact therewith during a cutting operation. Rotation of cutter as well as the power required to lift the tire into cutting contact therewith is provided by a hydraulic system having a flow divider which supplies power to an orbital motor to drive the blades and to a hydraulic cylinder which raises and lowers the tire supporting mandrel.

14 Claims, 6 Drawing Figures

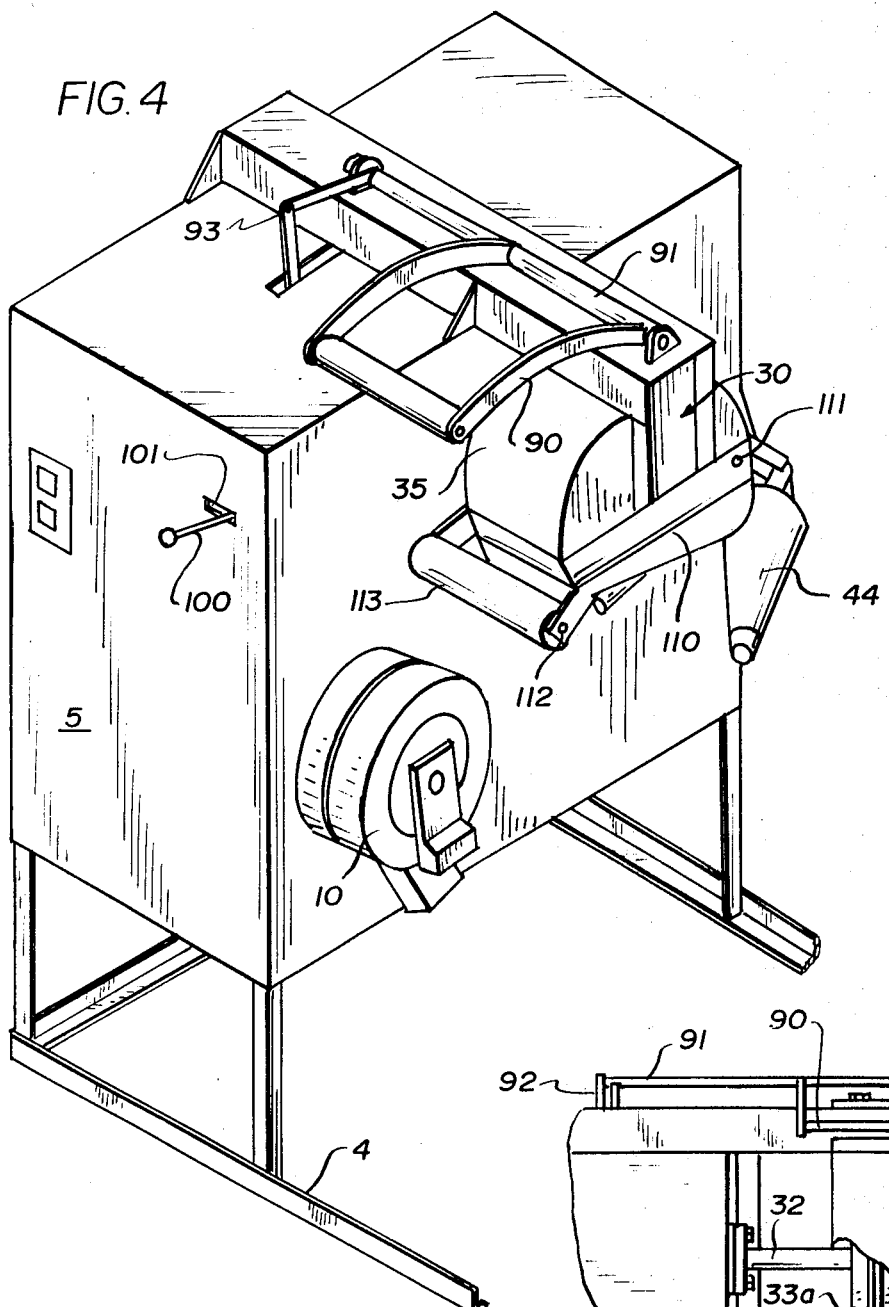
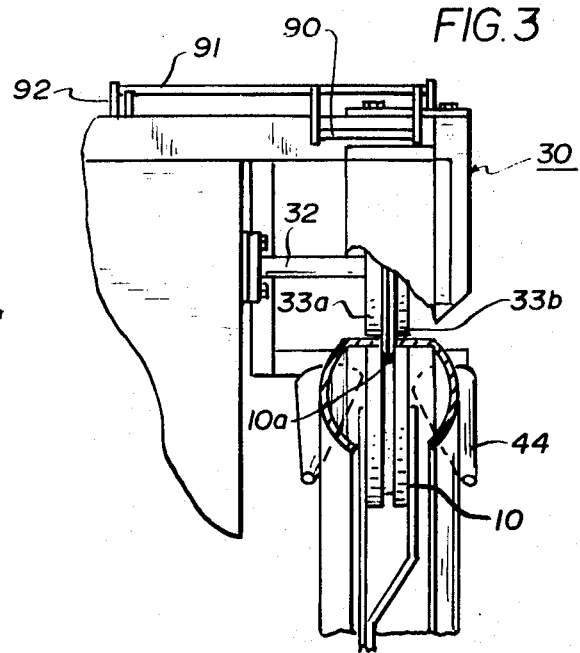

TIRE CUTTER APPARATUS

This is a continuation of application Ser. No. 229,635, filed Feb. 28, 1972, now abandoned.

BACKGROUND OF THE INVENTION

This invention relates in general to a cutting machine and in particular to a tire cutter apparatus.

More specifically, the invention relates to a tire cutter apparatus having a one or more fixed rotating knives which are located in a fixed position on a supporting frame and adapted to cut a strip or strips circumferentially of the crown of a tire. The tire is brought into contact with the rotating blades by means of a tire mandrel which is attached to a pivoted crank arm to lift a tire mounted thereon from a lower position upward into cutting contact with the knife. The mandrel is capable of supporting a variety of sizes and designs of tires and is lifted into cutting position by means of a hydraulic cylinder coupled to a crank arm. In addition, the rotating blades are operated by a fluid orbital motor wherein the power applied to the orbital motor as well as the mandrel is applied by the same hydraulic system.

In the automotive and trucking industry, it is well known that large numbers of worn out or damaged tires are accumulated which, because of their design, require a great amount of space to store or transport. In the prior art, attempts have been made to split or otherwise cut unwanted tires by means of various cutting apparatus in a manner such that the cut tires require considerably less space when stacked or positioned together. It is possible to haul or store such cut tires in a much smaller space resulting in greater economy than would otherwise be possible with tires in their normal state.

Prior tire cutters have been found to be deficient in several aspects. Many of the previous cutter apparatus have not achieved rapid and efficient cutting of tires which is necessary to render them economically feasible.

In addition, the design of the prior art devices did not permit tires of a variety of types and sizes to be readily accommodated by the apparatus, and such designs failed to provide reliable, effective and economical means for cutting the now popular wire, cord, and belt reinforced tires. The known machines also require considerable manual labor on the part of an operator of the cutter. Ofter, it was necessary for the operator to manually lift the tire into position for cutting or the machine required other difficult tasks which made the tire cutting operation inefficient. Therefore, it is desirable to provide a cutter apparatus which economically and efficiently cuts or splits the crowns of tires of a wide variety of sizes and regardless of the type of reinforcements and in a manner to overcome the problems presented by the prior art technique.

SUMMARY OF THE INVENTION

It is, therefore, an object of this invention to improve the cutting of tires.

Another object of this invention is to reduce the manual labor required in cutting a tire and the like.

A further object of this invention is to move a tire to be cut from a position remote from a tire cutting means to cutting contact therewith.

Another object of this invention is to improve the safety of a tire cutter by the provision of features such as: cutting blade shields; debris shielding; means permitting a rapid shut-down of the operation of the cutting element as desired; and rotation of blade and mandrel in a direction opposite and away from the normal work position of the machine operator.

These and other objects are attained in accordance with the invention wherein there is disclosed an improved tire cutter having one or more rotating cutting blades fixed in position on a frame and against which a mandrel lifts a tire to be cut from a lower position adjacent the support surface upon which the machine is supported to a position to contact the rotating blades for a cutting operation. The mandrel is lifted and the blades are rotated by means of a central hydraulic system which supplies power to a fluid cylinder and orbital motor, respectively.

The cutter apparatus herein disclosed also includes a novel tire guiding means which provides for accurate positioning of the tire when in contact with the blades to insure proper cutting thereof as well as to insure that the tire remains in positive contact with the cutter.

BRIEF DESCRIPTION OF THE DRAWINGS

Further objects of the invention, together with additional features attributing thereto and advantages accruing therefrom should be apparent from the following description of an embodiment of the invention when read in conjunction with the accompanying drawings wherein:

FIG. 3 is a partial schematic illustration showing a tire to be cut in cutting position on the tire cutter apparatus of FIG. 1;

FIG. 4 is a respective illustration of the tire cutter of FIG. 1 illustrating the safety bar feature of the invention;

DESCRIPTION OF THE PREFERRED EMBODIMENT

Figure 1:
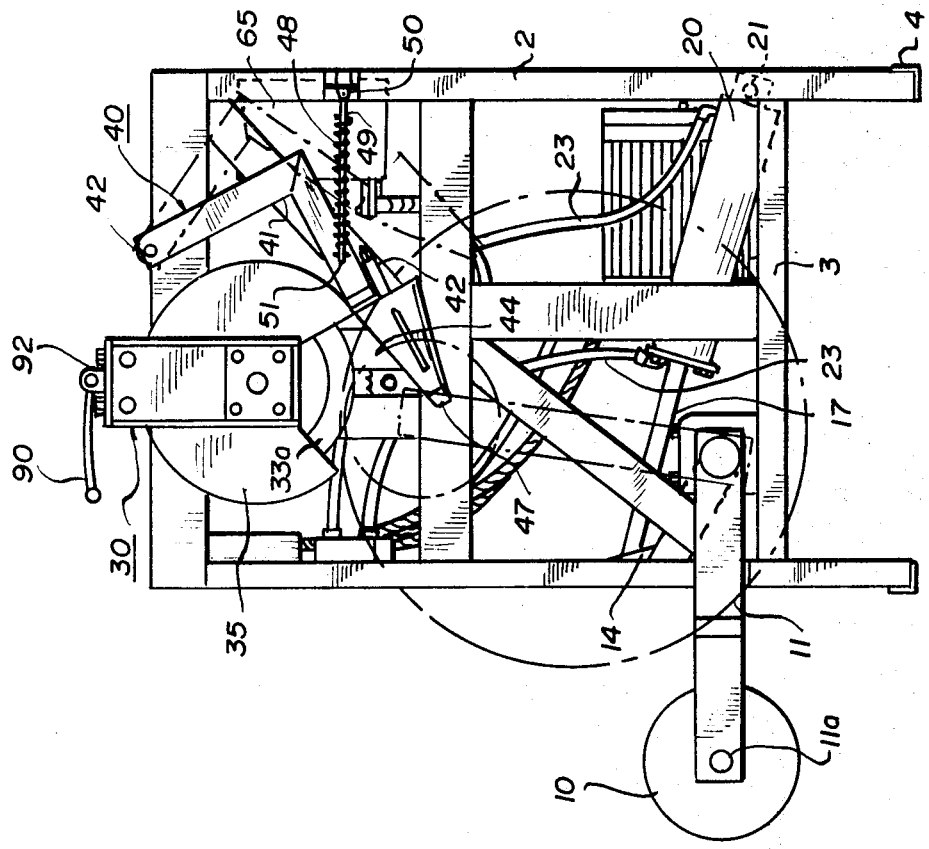
FIG. 1 is a side schematic illustration of an embodiment of the tire cutter apparatus of the invention.

Referring now to FIGS. 1 to 6 there is illustrated a preferred embodiment of the tire cutter apparatus of the invention. The tire cutter apparatus is mounted upon a frame 2 having a plurality of horizontally disposed members 3. The frame is supported upon a floor or ground surface by means of a pair of horizontally disposed legs 4 suitably attached to the frame. As best shown in FIG. 4, frame 3 may be covered by an enclosure 5 to protect and prevent access to the internal elements of the apparatus.

Figure 2:
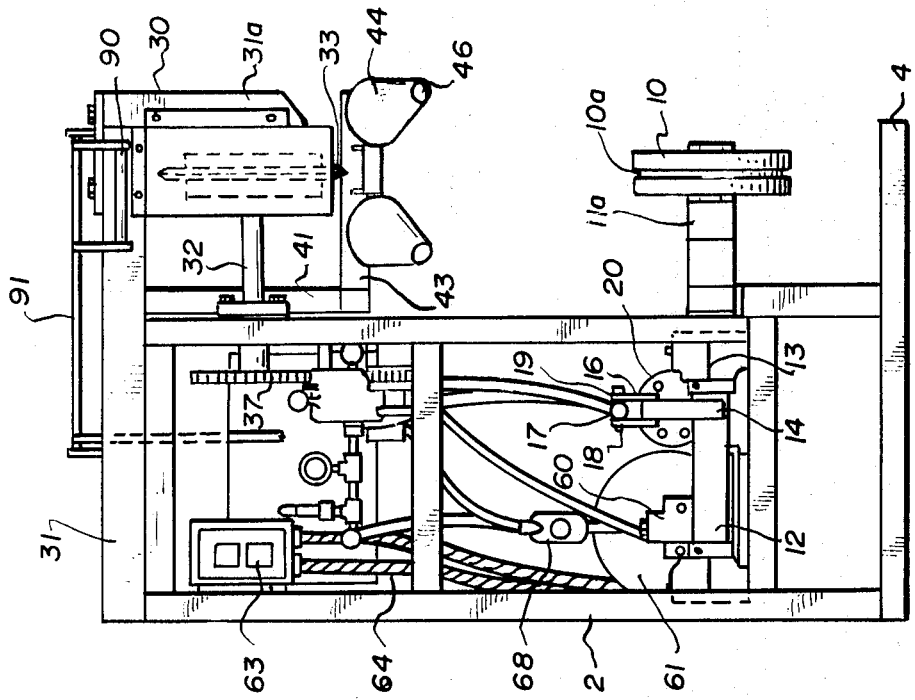
FIG. 2 is a front schematic illustration of the tire cutter apparatus of the tire cutter apparatus.

Referring to FIGS. 1 and 2 a mandrel or drum 10 is shown in it lower most position projecting away from the side of frame 3. Mandrel 10 is adapted to support and lift a tire to be cut in a manner to be described later. The mandrel includes a cylindrical configuration having a groove 10a formed on the peripheral surface thereof. A tire to be cut is mounted on the mandrel 10 by inserting the mandrel into the tire in contact with the interior side walls thereof. The mandrel is rotatably attached to an end of a crank arm 11 by means of a bracket 11a. Crank arm 11 includes two portions disposed 90° to each other wherein the other end of the crank arm 11 is pivotally attached to frame 3. The crank arm is fixedly attached to an end of a shaft 12 which is journaled in a pair of spaced bearings 13 on the frame whereby the shaft is rotatably supported thereby. It should be apparent that rotary movement of shaft 12 causes crank arm 11 to pivot and move mandrel 10.

Rotary movement is transmitted to shaft 12 by means of crank arm 14 affixed adjacent one end to the shaft. Crank arm 14 includes an end bracket 16 to which a power shaft 17 is pivotally coupled. The coupling of power shaft 17 and bracket 16 is accomplished by the insertion of shaft 18 through the bracket and a hole 19 provided near an end of power shaft 17. The power shaft 17 is operatively coupled to a conventional hydraulic cylinder 20 which effects either a extension or retraction of power shaft 17 to provide desired movement of mandrel 10. To achieve movement of mandrel 10, an end 21 of cylinder 20 remote from power shaft 17 is pivotally attached to frame 2 by suitable brackets whereby the hydraulic cylinder is pivotally moveable relative to the frame.

The hydraulic cylinder is supplied fluid power through a pair of fluid conduits 23 by the hydraulic system of the cutter apparatus of the invention which will be described in detail later. In FIG. 1 the mandrel is shown in its lower-most position whereby a tire may readily be mounted thereon for a cutting operation. Upon actuation, the hydraulic system of the invention will cause hydraulic cylinder 20 to retract or move power shaft 17 to the right viewing FIG. 1 and rotate shaft 12 whereby crank arm 11 lifts mandrel 10 to present a tire mounted thereon in position adjacent the cutter as shown in phantom in FIG. 1. During the retracting movement of power shaft 17 into the hydraulic cylinder, the cylinder undergoes a pivoted movement relative to the frame in view of the arcing movement being imparted to crank arms 11 and 14. As the mandrel is lowered from the upward position, the power shaft 17 moves outward from the hydraulic cylinder to reverse the rotary movement of shaft 12 and lower crank arm 11 and mandrel 10.

Figure 6:
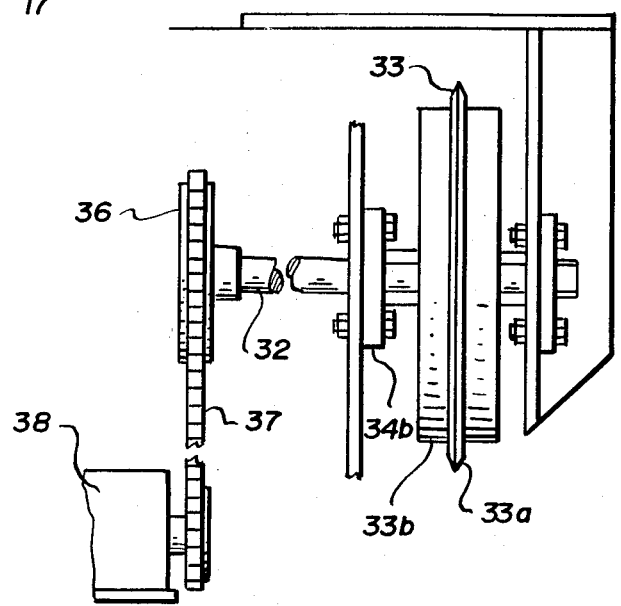
FIG. 6 is a sectional view taken along lines 6 — 6 of FIG. 1.

Referring now to FIGS. 1, 2 and 6, the cutting mechanism 30 of the tire cutter apparatus 1 is most clearly shown. Cutting mechanism 30 is mounted to a support member 31 which is attached to the top of frame 2 and includes a portion projecting beyond the frame. The projection of member 31 lies on the same side of the machine as mandrel 10 to permit the mandrel to bring contact between the tire and cutter mechanism. Support member 31 includes a downwardly disposed bracket 31a affixed to the projection thereof which receives an end portion of a shaft 32 in a bracket 34a wherein shaft 32 rotatably supports a cutting element 33. The other end of shaft 32 is mounted on a bearing 34b supported on frame 2 whereby the shaft extends therein. Bracket 31a further supports a guard 35 which substantially surrounds the upper portion of cutting element 33 to act as a safety guard.

As best shown in FIG. 6, cutting element 33 includes a knife 33a and a hub portion 33b wherein the hub portion is fixedly attached to shaft 32. The interior end of shaft 32 remote from cutter blade 33a is coupled to a motive drive means including sprocket 36 interconnected with a chain 37 which in turn is coupled to a conventional fluid orbital motor 38 which rotates shaft 32 and cutting element 33 at a desired speed. The orbital motor is supplied with necessary fluid power from the hydraulic system of the machine in a manner to be explained in detail later.

The lifting of a tire by mandrel 10 achieves the illustrated contact of blade 33a and a tire mounted on mandrel 20 as shown in phantom lines in FIG. 1 and as illustrated in FIG. 3. Hydraulic cylinder 20 applies a sufficient biasing force between the rotating cutter blade and the tire to provide penetration of the blade therethrough. Because of the biasing force existing between the rotating blade and the tire, the tire is moved relative to the mandrel to complete the cutting of the entire circumferential extent of the tire being split.

A tire positioning assembly 40 is mounted for pivotal movement in back of cutter mechanism 30 to insure safe and proper contact between the tire and cutter. Positioning assembly 40 includes a pivoted arm 41 having two sections disposed at 90° to each other along the same plane. The upper end of arm 41 is affixed to shaft 42 which is journaled for rotary movement in a pair of brackets 42a mounted on the top of frame 2. The other end of arm 41 includes a projection arm 43 which extends 90° therefrom outward from the frame wherein projection arm 43 supports a pair of spaced positioning cones 44 which extend beneath cutter blade 33a with the longitudinally axis of the cones disposed slightly downward. Cones 44 are rotatably mounted on projection arm 43 on shafts 45 which are suitably affixed to projection arm 43. The cones are attached to the shaft by end nut elements 47 which posses a complementary cone configuration as cones 44. A compression spring 48 is interposed between a vertical part of frame 2 and pivoted arm 41 in wrapping relationship to a shaft 49 which is pivotally attached at one end to frame 2 by bracket 50. The other end of the shaft extends through a collar element 51 which is suitably affixed to a side of arm 41. In operation of the tire cutter, lifting of the tire by mandrel 10 causes the tire to be interposed between the two positioning cones 44 whereby the movement of the tire towards the cutter causes arm 41 to pivot around shaft 42 and the cones move away from the cutter. The cones then being in contact with the tire being cut rotate due to frictional contact and maintain the tire in proper relationship with the cutter.

As stated previously, both hydraulic cylinder 20 effecting movement of mandrel 10 and orbital motor 38 inducing rotation of cutter blade 33 are hydraulically operated devices which are supplied fluid power by means of a single fluid hydraulic system. The fluid hydraulic system includes a hydraulic pump 60 which is supplied power by means of a conventional electric motor 61 including a power shaft 62 for supplying energy to pump 60. The pump and motor are mounted in the lower portion of the frame on suitable brackets (not shown) and the electric motor is adapted to be coupled to a suitable electric power source by electrical leads (not shown). On and off operation of the motor may be controlled by means of a electrical switch 63 which is coupled to the motor by means of electrical leads 64. The switch may be accessible to the exterior of the machine as best shown in FIGS. 2 and 4.

Figure 5:
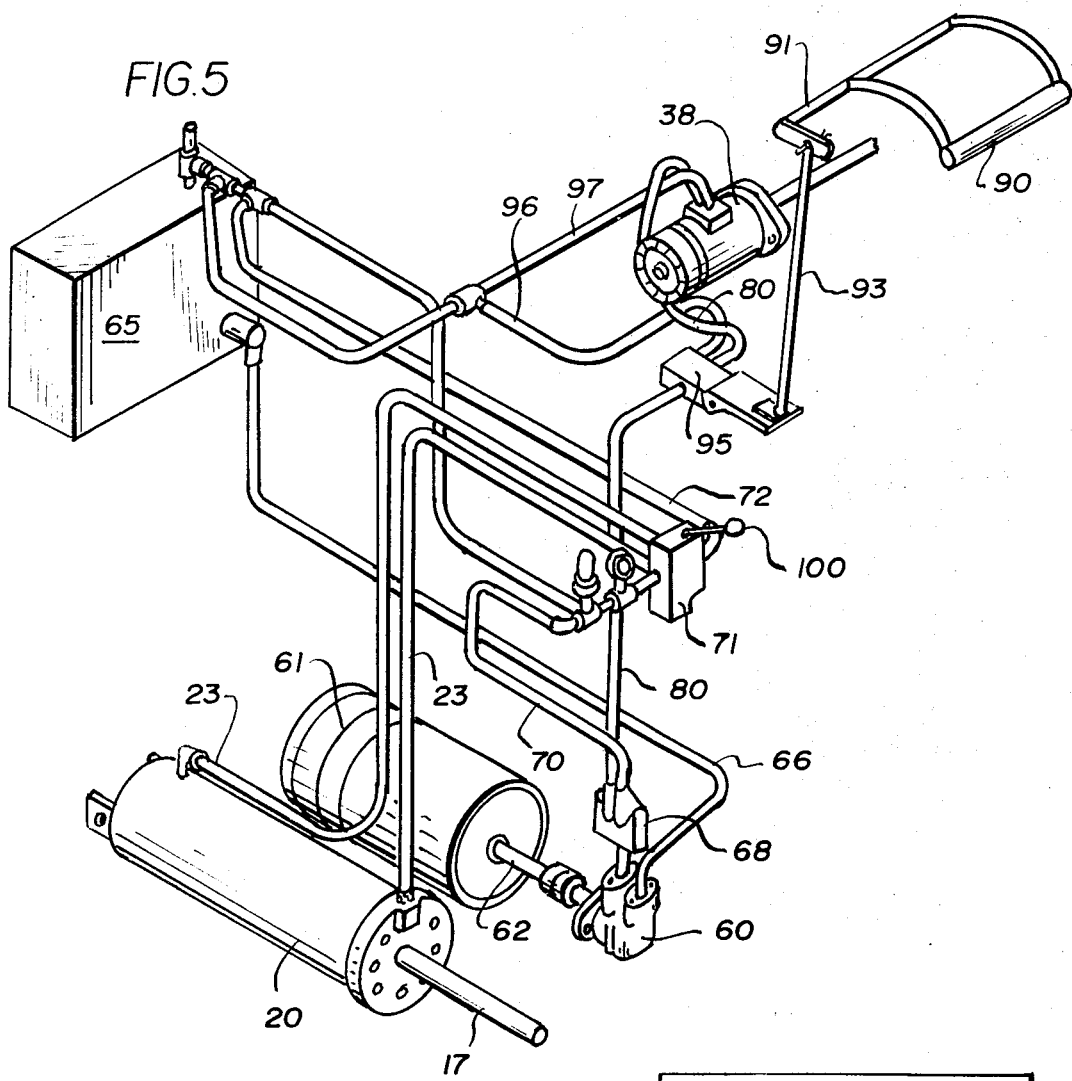
FIG. 5 is a perspective representation of the hydraulic fluid system of the tire cutter of FIG. 1.

Still referring to FIGS. 1 to 5 hydraulic fluid is supplied to hydraulic pump 20 from a hydraulic fluid supply reservoir or tank 65 which is mounted by suitable brackets to the upper rear portion of frame 2. Fluid supply tank 65 comprises a conventional reservoir adapted to receive and supply a hydraulic fluid such as oil. As best shown in FIG. 5, hydraulic fluid reservoir 65 is in fluid communication with hydraulic pump 60 by means of a fluid supply line 66 coupling the tank and pump. The pressure or energy level of the fluid entering through line 66 into the hydraulic pump 60 is increased thereby and exits from the pump at outlet line 67. The fluid moving through line 67 enters a conventional flow divider 68 which divides the fluid flow entering the device into two fluid lines respectively for supplying fluid power to orbital motor 38 and to hydraulic cylinder 20. The proportional ratio of divided flow depends on encountered conditions such as the relative power requirements of the hydraulic cylinder as compared to the orbital motor and the like.

The fluid power directed to hydraulic cylinder 20 is passed from the flow divider 68 through line 70 to a conventional hydraulic valve 71 which controls the operation of the hydraulic cylinder 20 as required by applying fluid pressure selectively through fluid lines 23. In addition, hydraulic valve 71 is coupled to reservoir tank 65 by means of a return fluid line 72. The second flow produced by flow divider 68 is passed through line 80 which is in connunication with orbital motor 38 to supply driving power thereto to create a predetermined rotation of cutter element 33. The rotational speed of cutter 33 depends on encountered conditions and is controlled by the amount of power supplied by the orbital motor. Generally, the speed of the cutter is of a near constant rotational value during the cutting operation although it may be varied by controlling the amount of fluid power supplied to the orbital motor.

Referring now to FIGS. 4 and 5 there is illustrated the safety-cut off device of the tire cutter apparatus of the invention. The safety mechanism of the invention includes a safety bar 90 having a handle configuration which is supported just above the cutter mechanism 30. The safety bar is pivotally attached to a shaft 91 which is carried on bearings 92 that are in turn suitably affixed to cutter support member 31. A linkage 93 extending into the housing is coupled to the rotary mounted shaft 91 whereby movement of the shaft is transmitted to a conventional bi-directional valve 94 shown in FIG. 5. The bi-directional valve 95 is interposed in fluid conduit 80 which supplies fluid power to orbital motor 38. In addition, bi-directional valve 95 is coupled to a fluid line 96 which is in fluid communication with reservoir 65.

In the "up" position of the handle 90 as shown in FIG. 4, fluid pressure supplied by flow divider 68 is directed through bi-directional valve 95 into orbital motor 38 in a manner to cause the cutter 33 to rotate. An operator may pull handle 90 downward so that the movement thereof is transmitted through linkage 93 to valve 95 wherein the flow is diverted by bi-directional valve 95 from line 90 into fluid conduit 96 and eventually back to reservoir 65. The diverting of oil flow away from orbital motor 38 to the reservoir permits the stopping of the rotation of cutter 33 even though operation of hydraulic cylinder 20 and mandrel 10 continues. Thus, the safety bar allows an operator to efficiently and safely control the rotational movement of the rotating blade during operation of the machine. To control the upward and downward movement of mandrel 10, a control linkage 100 is operatively connected to hydraulic valve 71 which controls hydraulic cylinder 20. As best shown in FIG. 4, control linkage 100 extends through an opening 101 provided in the exterior of the housing whereby upward or downward movement of the mandrel can be effected when desired.

In addition to safety bar 90, the tire cutter apparatus of the invention possesses other safety features including a pivotedly mounted guard 110 as best shown in FIG. 4. Illustration of guard 110 is omitted from FIGS. 1 and 2 for purposes of clarity. Guard 110 includes a U-shaped arm portion which surrounds the lower part of the exterior of upper cutter guard 35 and is pivotedly mounted thereto at pivots 111. A pair of projections rotatably support a roller 113 which is adapted to contact a tire being cut as the tire approaches cutter 33. In a non-cutting position of the mandrel and cutter, guard 110 is in its downward position shown in FIG. 4 and acts as a lower guard for the cutter blade 33a. As mandrel 10 brings a tire upward in vicinity of cutter 33, the tire contacts roller 113 and raises lower guard 110 upward an amount sufficient to achieve cutting of the tire by blade 33a. During the upward positioning of guard 110 during cutting, sufficient lateral protection is provided by guard 110 to prevent sideward hurling of pieces of material from the tire being cut. A further barrier behind cutter 33 is provided by the portion of projection arm 43 extending between cones 44 which prevents hurling of material rearward of the machine. An operator is also protected by the rotating of cutter 33 in a counter-clockwise direction during operation to induce pieces of tires to be thrown rearward and away from the front of the tire cutter.

In the above description there has been disclosed an improved tire cutter apparatus for slicing or splitting the crown of a tire. The novel tire cutter of the invention is capable of safely and efficiently cutting a variety of types and sizes of tires even when the tires possess wire, fiber glass, steel or othr reinforcing elements. While the invention has been described with reference to a single rotating blade, it is within the scope of the invention to utilize two or more rotating blades depending on the desired manner of cutting a tire. In addition, the form of the cutting blade utilized in the machine of the invention may encompass other types of knives and cutting elements depending on the material being cut or desired results.

While the invention has been described with reference to a preferred embodiment, it will be understood by those skilled in the art that various changes may be made and equivalents may be substituted for elements thereof without departing from true spirit and scope of the invention. In addition, many modifications may be made to adapt a particular situation or material to the teachings of the invention without departing from essential teachings.

What is claimed is:
1. A tire cutting apparatus comprising
frame means,
cutting means having at least one rotatably mounted cutting element supported on the frame means,
motor means operatively coupled to the cutting element to cut a tire in contact therewith,
mandrel means mounted on the frame means and adapted to support a tire to be cut,
power means supported on the frame means for producing relative movement between the cutting means and the mandrel to effect operative contact therebetween for cutting a tire, positioning means operatively coupled to the frame means adjacent the cutter element for maintaining positive operative contact between the tire and cutting means during cutting, and pivotal guard means mounted on said cutting means and being movable away from said cutter in response to contact by the tire.

2. A tire cutting apparatus comprising frame means, cutting means having at least one rotatably mounted cutting element supported on the frame means, motor means operatively coupled to the cutting element to rotate the cutting element and cut a tire in contact therewith, mandrel means adapted to support a tire to be cut, said mandrel means movably supported on the frame means between a first position and a second position adjacent the cutter element, power means operatively connected to the mandrel means to move the mandrel means either from the first position to the second position to cause a tire supported thereon to contact the cutting element or from the second position to the first position to remove a tire from contact with the cutting element, guard means positioned adjacent the cutting means for covering the cutting element when a tire is not in contact with the cutting element and for moving away from the cutting element to permit contact between the tire and the cutting element and positioning means being biased to guide a tire between said first and second positions and maintain alignment of a tire during cutting.

3. The tire cutter of claim 2 wherein the guard means is pivotally mounted on the cutting means.

4. The tire cutter of claim 2 wherein the grard means includes a roller to permit relative movement between the guard means and a tire in contact therewith.

5. A tire cutting apparatus comprising frame means, cutting means having at least one rotatably mounted cutting element supported on the frame means, motor means operatively coupled to the cutting element to cut a tire in contact therewith, mandrel means mounted on the frame means and adapted to support a tire to be cut, power means supported on the frame means for producing movement of the mandrel upward to contact the cutting element to effect operative contact therebetween for cutting a tire, positioning means operatively coupled to the frame means adjacent the cutter element for maintaining positive operative contact between the tire and cutting means during cutting, and said positioning means being resiliently biased in position substantially between the cutting element and the mandrel and mounted for movement away from the cutter in response to upward movement of a tire to contact the cutting element.

6. The tire cutter apparatus of claim 5 wherein the positioning means is pivotally attached to the frame.

7. The tire cutting apparatus of claim 5 wherein the motor means and the power means are fluid operated.

8. The tire cutting apparatus of claim 7 wherein the motor means and power means are coupled to a common source of pressurized fluid.

9. The tire cutting apparatus of claim 8 wherein the source of pressurized fluid includes a hydraulic pump for providing pressurized fluid, conduit means coupled to the pump and said conduit means including a flow divider for supplying a portion of pressurized fluid to the motor means and the remaining portion to the power means.

10. The tire cutting apparatus of claim 8 further including safety cut off means interposed between the source of pressurized fluid and the motor means to selectively discontinue operation of the motor means.

11. The tire cutting apparatus of claim 10 wherein the safety cut off means includes an actuation element positioned adjacent the cutting element.

12. The tire cutting apparatus of claim 5 wherein the positioning means includes at least one rotatable mounted element positioned adjacent the cutting element.

13. The tire cutting apparatus of claim 5 wherein the positioning means includes a pair of rotatably mounted elements operatively coupled to the frame means for contacting the tire to be cut.

14. The tire cutter apparatus of claim 3 wherein the rotatably mounted elements comprise a pair of spaced cones for contacting a tire therebetween.

* * * * *

UNITED STATES PATENT OFFICE
CERTIFICATE OF CORRECTION

Patent No. 3,830,120    Dated August 20, 1974

Inventor(s) Harold Severin Peterson

It is certified that error appears in the above-identified patent and that said Letters Patent are hereby corrected as shown below:

Column 1, line 50, "ofter" should read -- often --. Column 5, line 59, "line 90" should read -- line 80 --. Column 6, line 39, "othr" should read -- other --.

Signed and sealed this 12th day of November 1974.

(SEAL)
Attest:

McCOY M. GIBSON JR.    C. MARSHALL DANN
Attesting Officer       Commissioner of Patents